United States Patent [19]  
Roa et al.

[11] Patent Number: 4,632,323  
[45] Date of Patent: Dec. 30, 1986

[54] FOOD GRINDER

[75] Inventors: Alvaro H. Roa; Jaime Cuartas, both of Medellin, Colombia

[73] Assignee: Nabisco Brands, Inc., Parsippany, N.J.

[21] Appl. No.: 537,820

[22] Filed: Sep. 30, 1983  
(Under 37 CFR 1.47)

[51] Int. Cl.⁴ .............................................. B02C 7/14
[52] U.S. Cl. ................................... 241/247; 241/250; 241/260.1; 241/82.1
[58] Field of Search .............................. 241/82.1-82.7, 241/246, 247, 250, 259, 259.1, 259.21, 259.3, 260.1

[56] References Cited  
U.S. PATENT DOCUMENTS  
4,037,798  7/1977  Schnitzer ................... 241/246 X FOREIGN PATENT DOCUMENTS  
501028  2/1951  Belgium ............................ 241/246  
91896  4/1938  Sweden ............................. 241/246

Primary Examiner—Howard N. Goldberg  
Assistant Examiner—Timothy V. Eley  
Attorney, Agent, or Firm—Richard Kornutik

[57] ABSTRACT

An improved food crusher is described in which a grinder housing is formed with a food chamber and a food transport in the form of a screw. Inner and outer grinder disks are employed wherein the inner disk is removably mounted to the housing in a stationary position and the outer disk is removably affixed to the screw with coupling means that provide positive drive connection to the screw with axial retention, yet enables convenient removal from the screw. The coupling means includes a hammer shaped tip that is an integral part of the screw and which fits through a correspondingly preferentially shaped hole in the outer disk to enable the tip to be turned after passage to lock the outer disk to the screw. Disassembly of the food grinder involves a reverse motion of the screw to disengage the outer disk from the screw followed by simple removal of the inner disk from the housing.

9 Claims, 8 Drawing Figures

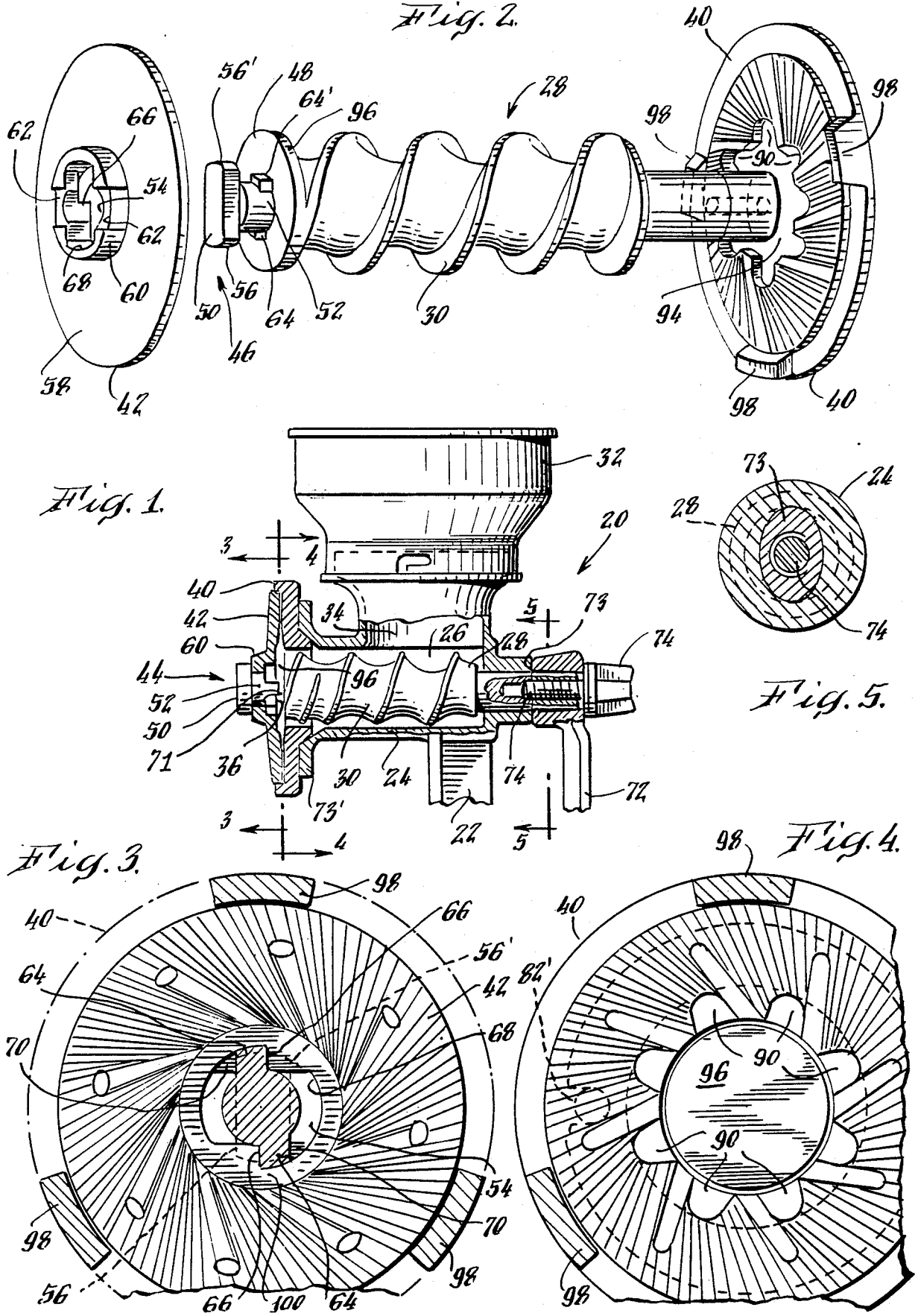

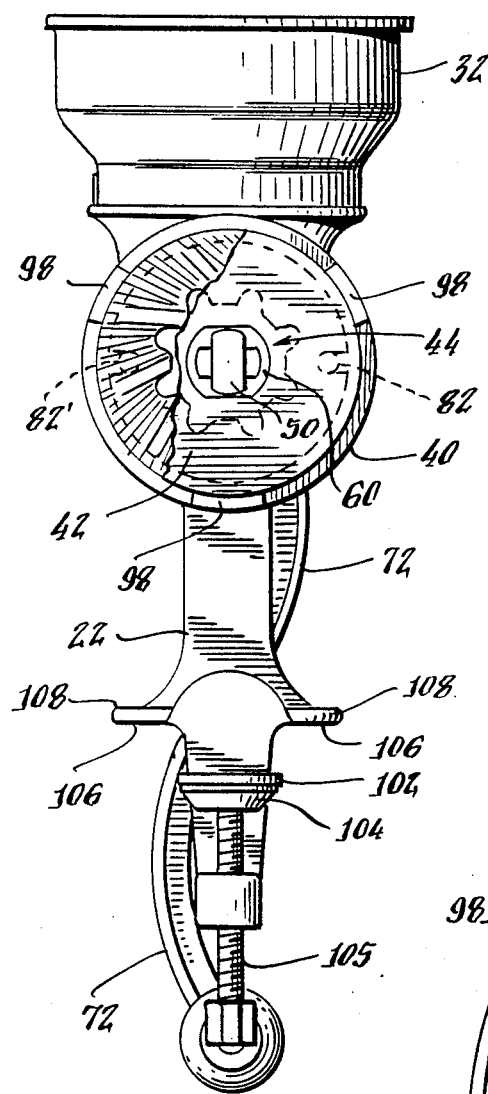
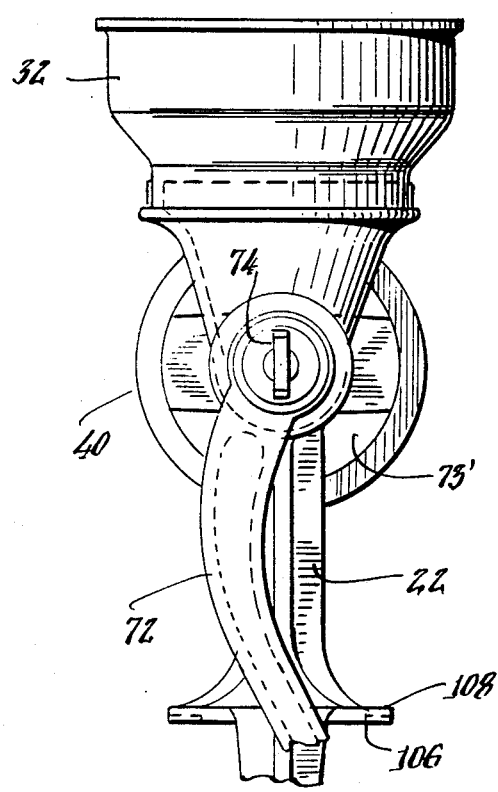
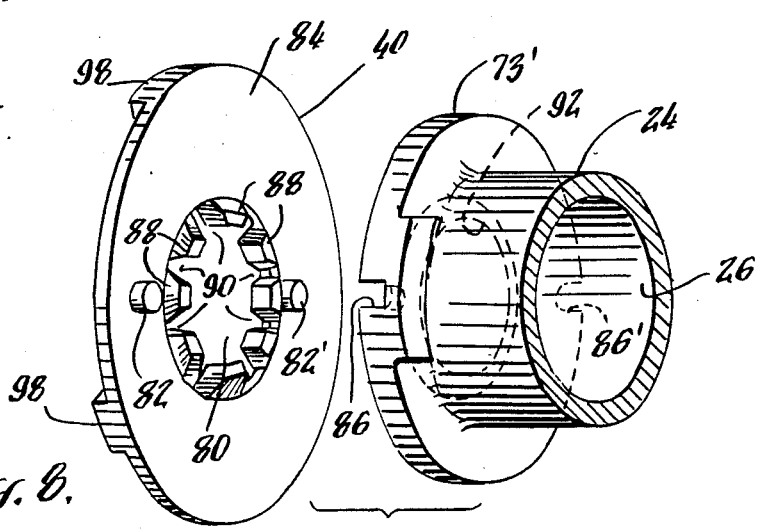

FOOD GRINDER

FIELD OF THE INVENTION

The present invention relates to food crushers. More particularly, it relates to an improved food grinder of the type called "corn" grinders, but which may also be used to reduce other soft or semi-soft foods to a paste in households.

BACKGROUND OF THE INVENTION

Grinders familiarly called "corn" grinders are well known and common in households. In these, the grinding of corn is carried out to prepare cereals or corn, for example for griddle cakes or the like. This type of food grinder has been known since at least 1908 and has not undergone any substantial change during this lengthy period of time, although it has received broad acceptance and use.

These conventional grinders need to be more effective and economical to make with a reduction of their weight and an elimination of as many as possible parts. These parts are numerous and render it burdensome and difficult for kitchen personnel to assemble, disassemble and clean the food grinders.

Food grinders of this type include a stationary grinder disk and a rotating grinder disk. These disks are closely placed next to each other so that the grinding of food and its conversion to a paste can be carried out between grooved facing surfaces of the disks. The emplacement and fastening of the disks normally requires a large number of parts and pieces and almost always includes the permanent attachment of one disk to the grinder housing. This disk usually is an inner stationary disk relative to which the other or outer disk is turned for grinding. The use of a large number of parts, with a disk that is welded to the housing or which constitutes an integral part of the grinder housing, causes the assembly or disassembly of the grinder to be complicated and, at times, really difficult, and also renders it difficult to do a thorough cleaning.

OBJECT OF THE INVENTION

It is, therefore, an object of this invention to provide an improved household food grinder with a reduced number of parts.

It is a further object of the invention to provide an improved household food grinder whose weight is substantially less than that of a conventional food grinder.

It is another object of the present invention to provide a food grinder whose placement on a table or base to which it is screwed will be more effective and secure than for tranditional food grinders.

It is another object of the present invention to provide a food grinder with grinding disks which are both removable from the grinder housing for cleaning.

It is another object of the present to provide a food grinder in which grinder disks and a food transport system is used that can be disassembled and assembled with minimum effort without requiring common fastening elements used in traditional food grinders.

Other advantages and objects of the invention can be understood from the following description of the invention described hereafter with reference to the attached drawings.

BRIEF DESCRIPTION OF DRAWINGS

FIG. 1 is a partial sectional view in elevation of a food grinder in accordance with the invention;

FIG. 2 is an enlarged exploded view of parts of the food grinder of FIG. 1;

FIG. 3 is a section view of the food grinder of this invention taken along the line 3—3 in FIG. 1;

FIG. 4 is a section view of the food grinder according to the invention taken along the line 4—4 in FIG. 1;

FIG. 5 is a section view of the food grinder according to the invention taken along the line 5—5 in FIG. 1;

FIG. 6 is a front view in elevation, partially broken away of the food grinder of FIG. 1;

FIG. 7 is a rear view in elevation of the food grinder according to FIG. 1;

FIG. 8 is a partial exploded view of a grinder disk and housing used with the food grinder according to FIG. 1.

DETAILED DESCRIPTION OF DRAWINGS

With reference to FIG. 1, a food grinder 20 according to the invention is shown with a generally similar appearance as a conventional grinder. The grinder 20 includes a traditional support 22 to secure the grinder to the edge of a table or other flat surface as shown in full in FIG. 6.

The food grinder 20 is formed with a conventional housing 24 having a horizontally oriented food crushing chamber 26 and a food transport system in the form of a screw 28 with a deep thread 30 to move food supplied through a hopper 32 and opening 34. The screw is operatively tapered, such as with a gradually shallower screw thread 30 towards the discharge opening 36 of the housing 24 to thus crush the food such as corn between the screw 28 and wall 38 of the chamber 26.

The discharge opening 36 is covered by a pair of axially aligned grinding disks 40, 42. The inner disk 40 is removably mounted to housing 24, but held in a stationary position relative thereto. The outer disk 42 is removably mounted to screw 28 to rotate with it. The outer grinding disk 42 is rotated relative to the inner grinding disk 40 to thus grind and crush food to form a food paste.

A basic and desirable feature of the invention involves the deletion of at least six parts traditionally used in grinders and eliminates the permanent fixation of one of the grinder disks to the discharge opening 36 of the housing 24. In conventional grinders, grinding disks are also located at the discharge opening 36 with the inner disk integrally welded to housing 24 while the movable disk is rotatably mounted with a complicated mechanism that includes a large number of separate parts.

For example, in the best known mode of mounting the rotatable outer grinding disk, it is pressed for attachment against the threaded tip of a central shaft of the transport screw by means of a clamp or flange while also squeezing the movable outer disk against the inner stationary disk. Such clamp or flange is generally made up of at least six parts which normally consist of: (a) a clamp including two legs, parallel to each other, connected by a central bridge section at a right angle to the legs; (b) two wing screws, one at each end of the legs, to fasten the clamp to projections or flanges integral with the discharge opening of the housing; (c) a wing screw which is applied to the middle part of the central bridge section of the clamp and which is used to squeeze the outer disk and inner disk together; (d) a lock nut below the wing screw; (e) a small steel sphere which is seated in a hollow of the bridge section of the clamp and the concave tip of the shaft of the transport screw.

In addition to these excessive number of parts as listed above, a conventional food grinder may use an inner grinding disk which is welded to or made an integral part of the housing. As a result, cleaning of the interior of the housing and its attached disk is impeded and made more difficult. Even though some smaller food grinders use a different clamp system as described such as a strap which squeezes the rotatable outer disk against the fixed inner disk, the cleaning operation remains impeded when the inner grinding disk is fixed to the discharge opening of the housing.

With a food grinder 20 in accordance with the invention, the parts needed for grinding have been reduced to two, namely, a removable but stationary inner disk 40 and a removable rotatable outer disk 42. These disks are fastened and positioned with respect to each other in a simple and uncomplicated manner with coupling means 44 that is affixed to one end of the screw so as to releasably engage the outer disk with positive axial retention and positive rotational drive by the screw in one direction while enabling disengagement and thus release of the screw from the outer disk upon screw rotation in an opposite direction. In this manner the housing can be opened up for better cleaning and care.

The means 44 is in the form of a hammer shaped tip 46 affixed to and extending from an axial end surface 48 of screw 28. Tip 46 preferably is made an integral part of screw 28 such as by forming a single metal casting. Tip 46 has a cross member 50 that extends laterally from a shaft 52 that extends axially from end surface 48. Cross member 50 is shaped to snugly fit through a correspondingly shaped hole 54 in rotatable outer disk 42. The hole 54 and thus also cross member 50 of tip 48 are preferentially shaped and centrally positioned to enable a passage and then turning of the cross member 50 through hole 54. This then brings the end portions 56, 56' of cross member 50 over the outer disk surface 58 to retain the outer disk 42.

In the embodiment shown, outer grinder disk 42 has an integral central hub 60 which protrudes past surface 58 and has axially extending notches 62, 62' shaped to receive the end portions 56 of tip 46. Rotational drive of outer disk 42 is obtained through a pair of radially extending and diametrically oppositely located drive elements 64, 64' that are adjacent end surface 48. Each drive element 64 is shaped to contact a corresponding drive surface 66 on the inner wall 68 of hub 60. The drive surfaces 66 are so located that they each are operatively and positively engaged by an element 64 when the screw 28 is rotated in a grinding direction, such as clockwise, while permitting a release of the outer disk with an opposite screw rotation relative to disk 42.

As shown in FIGS. 2 and 3, the drive surfaces 66 extend radially from the axis of rotation and are formed in recesses 70 which extend radially outwardly into the inner wall 68 of hub 60. Recesses 70 are axially open on one side for access by drive elements 64 as tip 46 of screw 28 is passed into hole 54 to engage outer disk 42.

Both rotational drive and control over the gradation of fineness of the ground paste obtained in grinder 20 is achieved with handle 72 and a screw 74 used to fasten handle 72 to end 73 of housing 30. Thus, screw 74 is effectively seated, through the handle 72, onto housing end 73 to thus be able to pull on end 73 of screw 28. This then allows the application of a greater or lesser force by tip 46 against outer disk 42 to correspondingly produce a greater or lesser compression of the two disks 40 and 42.

In the assembly of grinder 20 the transport screw 28 extends with its end 71' as shown in FIG. 1 through a star shaped opening 80 (see FIG. 8) in the inner disk 40. The minimum diameter of opening 80 has a width so as to permit the passage of paste pushed by the screw thread 30. The inner disk 40 may then be placed on the housing in a loose fashion such as that as shown in the view of FIG. 8. Pins 82, 82' are provided on side surface 84 to engage corresponding holes or slots 86, 86' in the end 73' of housing 24. The pins serve to prevent rotation of inner disk 40. Inner disk 40 further is provided with sloped segments 88 separated by spaces 90 and aligned along a circle and having outer surfaces aligned along a cone. Segments 88 fit flush against a conical counterbore 92 formed in end 73' of housing 24. Segments 88 surround a central opening 94 sized to snugly pass the end wall 96 of screw 28 (see FIG. 1). Inner disk 40, as shown in FIGS. 1–8, is provided with rim located retainer tabs 98 arranged along a circle concentric with the axis of rotation of screw 28. Tabs 98 enable snug peripheral containment of outer disk 42.

When assembled, the end wall 96 of screw 28 essentially seats against an annular seating surface 100 (see FIG. 3) of outer disk 42 so as to effectively close up hole 54 and prevent paste from bypassing the grinding action between the disks by discharge through hole 54. After introduction of the tip 46 through hole 54, the screw is rotated 90 degrees and pulled backwards so that the crossmember 50 lines up and engages the recesses 62 in outer disk 42. The assembly is fastened by tightening screw 74 against the crank 72, thus compressing the disks 40, 42 against the end wall 73' of housing 24.

Since the outer disk 42 has a smaller diameter than inner disk 40, the outer disk is tightly pressed against inner disk 40. Tabs 98 thus serve as a guide for placement of outer disk 42 which is free to rotate when the handle 72 is cranked. This fastening of the inner disk 40 to housing 24 advantageously permits its easy removal for cleaning of all the parts as well as the housing while also eliminating the need for welding or other attachment techniques of inner disk 40 to housing 24.

In another feature of the invention as more clearly visible in the view of FIG. 6, the food grinder 20 is more conveniently tightly secured to a surface or platform with the addition of a resilient layer 102 on the head 104 of an attachment screw 105. The layer 102 may be made of rubber and such layer can, if desired, be also applied to the underside 106 of support members 108.

Having thus described and illustrated the improvements made to a conventional household corn grinder with a food grinder in accordance with the invention, its advantages can be appreciated. The described embodiment of the invention is made without an intent to limit, the invention being defined by the following claims.

What is claimed is:

1. A manually driven food crusher employing a husing having, below a food entrance, a food crushing chamber in which a food transport is located in the form of a screw that is so shaped and effectively tapered as to crush food force to move towards a discharge opening of the chamber by the screw, an inner grinder disk mounted across the discharge opening and an outer grinder disk located adjacent the inner disk and mounted to rotate relative thereto to grind food between the disks as the food emerges from the discharge opening into space between the disks, comprising:

an inner grinder disk the improvement that is shaped to be removably mountable in a stationary position to the housing;

an outer grinder disk that is shaped to be removably mounted to the screw and means affixed to the outer disk for rotational drive thereof; and means affixed to one end of the screw and having a preferentially shaped hole extending therethrough for releasably engaging the means affixed to the outer disk with positive axial retention and positive rotational drive in one direction of rotation by the screw, while enabling release between the screw and the outer disk upon screw rotation opposite to said one direction of rotation said latter means including a tip affixed to an axial end surface of the screw, said tip being shaped to pass through said hole at a particular rotational position of the screw while extending over one outer disk surface that faces away from the screw upon rotation of the screw in said one direction.

2. The food crusher as claimed in claim 1 and wherein said means affixed to the outer disk further having a circumferentially facing drive surface that is oriented to face opposite to said one direction of rotation and is so circumferentially located relative to the preferential alignment of said hole that such means affixed to said screw positively engages the drive surface upon rotation of the screw in said one direction when said tip extends over said outer disk surface.

3. The food crusher as claimed in claim 2 wherein said means affixed to said outer disk has an axial seating surface facing said axial end surface of the screw to axially seat the outer disk onto the screw, said tip including a central shaft affixed to the tip and axially extending from the axial end surface of the screw; and wherein said means affixed to the screw includes a drive element that extends radially relative to the shaft and adjacent said screw axial end surface to positively engage the drive surface on said outer disk when said tip extends over said outer disk.

4. The food crusher as claimed in claim 3 wherein said tip has the shape of the head of a hammer with end portions of the head of the tip extending over said outer disk surface when said drive element engages the drive surface.

5. The food crusher as claimed in claim 4 wherein said means affixed to the outer disk has a central hub around said hole and said hub has an inner wall along said hole, said inner wall having radially outwardly extending recesses bounded by axial and radial portions of the inner wall, with the radial portions each forming a said drive surface, and with the recesses being each axially open for access by a drive element on the screw.

6. The food crusher as claimed in claim 5 wherein the tip has a cross member with radially extending oppositely located end portions and wherein the hub protrudes past said one outer disk surface and has axially extending notches shaped to receive the end portions of the cross member of the tip.

7. The food crusher as claimed in claim 5 wherein said screw has a pair of said drive elements, each being located to enter a recess and engage a drive surface therein.

8. The food crusher as claimed in claim 7 wherein said screw, said tip, said shaft and said drive elements are formed of an integral metal casting.

9. The food crusher as claimed in claim 7 wherein said tip end portions and the drive elements are in general alignment with each other so as to enable passage of the tip through the hole.

* * * * *